Feb. 3, 1942. F. C. BASELT 2,271,614
PROJECTION SCREEN
Filed Nov. 4, 1938

INVENTOR.
Frederick C. Baselt
BY
ATTORNEYS

Patented Feb. 3, 1942

2,271,614

UNITED STATES PATENT OFFICE 2,271,614

PROJECTION SCREEN

Frederick C. Baselt, New York, N. Y., assignor to American Can Company, New York, N. Y., a corporation of New Jersey Application November 4, 1938, Serial No. 238,906

2 Claims. (Cl. 88—24)

The present invention relates to home movie or projection screens or the like and has particular reference to an efficient screen of economical construction which will be equally bright when viewed from any angle when light is projected onto its surface.

One of the chief problems in the projection of home movies deals with the light source and with the screen surface which receives the light. All light which reaches the screen must pass through the film in the projector. If the light source is made too powerful, the attendant heat may char or burn the film should it be even momentarily stopped in front of the light. With such intense light stopping of the film at any one picture to view it on the screen as a still would not be possible. From a practical standpoint, therefore, the light source must be reduced in intensity but this correspondingly produces a dimmer picture on the screen. The effectiveness of the screen becomes an important factor.

For best performance the screen should reflect back substantially all of the light which strikes it. The reflection should not be merely a straight front reflection such as that effected by a mirror. A picture shown on a mirror reacting screen is extremely bright when viewed from behind the projector, i. e., a straight front view as to the screen surface but is dim from all other angles. This condition more or less usually prevails in aluminum surfaced screens which are largely used in this work.

The screen reflection should be accompanied with a certain amount of refraction or what might be termed dispersed reflection such as that observed on a field of snow. This means that each tiny area of the screen should take the light that strikes it and send it back in all directions, absorbing as little of the light as possible during the process. A picture projected on such a screen will be equally bright when viewed from any angle. Heretofore only extremely expensive asbestos screens having a coating of sintered glass obtained such results.

The present invention contemplates an inexpensive and easily produced screen having such desirable characteristics which reflect back substantially all of the light which strikes it as a dispersed reflection which when viewed from any angle is substantially of the same uniform intensity.

An object therefore of the invention is the provision of a home movie screen of economical construction which can be produced on a manufacturing basis but which at the same time will produce results comparable with extremely expensive glass screens in giving a more perfect field of dispersion of the light.

Another object is the provision of such a movie screen which may be easily produced and one adapted for association in a substantial metallic structure, such as a unit embodying a screen surface which will return practically all of the light which strikes it simulating a completely dispersed reflection which will appear as equal intensity from any angle.

Numerous other objects and advantages of the invention will be apparent as it is better understood from the following description, which, taken in connection with the accompanying drawing, discloses a preferred embodiment thereof.

Referring to the drawing.

Figure 1:
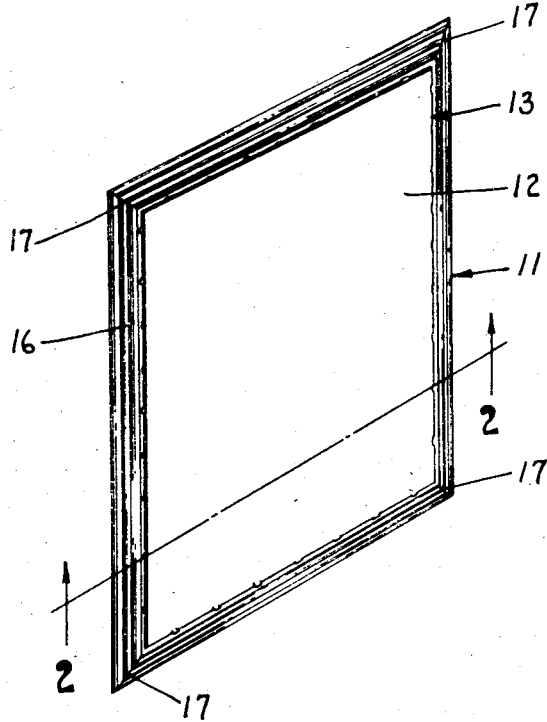
Figure 1 is a perspective view of a movie screen embodying the instant invention.
Figure 2:
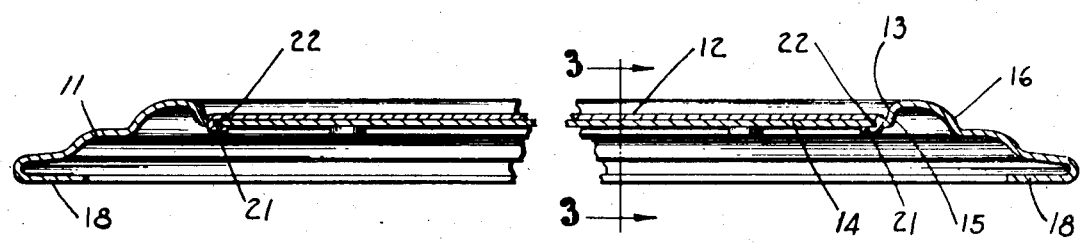
Fig. 2 is an enlarged transverse section taken substantially along the line 2—2 in Fig. 1, with parts broken away.

As a preferred embodiment of the invention the drawing illustrates a frame structure 11 which carries an improved screen member or screen element 12. The frame structure 11 is preferably rectangular in shape since it frames a surface for reflection of an image of a conventional film. Such a frame may be stamped out of metal. This structure is provided with a centrally disposed depressed panel 13 having a flat bottom wall section 14 the outer edges of which merge into upwardly and outwardly sloping side wall sections 15.

These side wall sections merge into outwardly and downwardly curved and sloping wall sections 16 providing a moulding resembling that of a picture frame. The corners of this frame are mitered as at 17 and the outer edge of the frame is bent back under the curved wall sections 16 in a flange section 18 thereby reinforcing the frame and also providing it with a smooth outer edge.

The screen element 12 is preferably rectangular in shape and is disposed within the panel 13 with its back against the panel bottom wall 14. The outer edge of the screen is provided with a plurality of lugs 21 which fit within slots 22 formed in the panel bottom wall when the screen is in place in the panel. These lugs are bent over after the screen is in place and hence hold the screen tightly against displacement. This manner of mounting the screen provides a rigid structure which supports the screen with a stiff backing so that flexing or bending is prevented.

Figure 3:
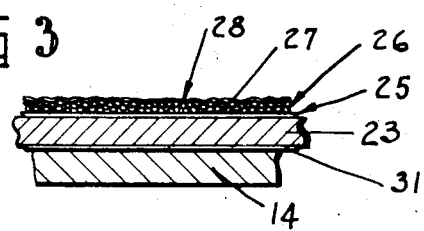
Fig. 3 is a greatly enlarged sectional detail taken substantially along the line 3—3 in Fig. 2.

The screen element 12 is preferably built up on a base 23 (Fig. 3) of sheet metal, such as black iron, tin plate or the like and its outer surface is treated in an improved manner to impart to it a light reflecting medium which will substantially disperse light in all directions equally. In some respects such a treatment uses some of the steps disclosed in United States Patent 1,204,005, issued November 7, 1916, to George J. Glotzbach, on Process of ornamenting metal, and may be considered as an improvement thereon.

In such surface treatment the face of the screen base 23 to be used as the reflecting surface is first preferably coated to give it a background 25 (Fig. 3) having bright shining surface and high reflecting power. It has been found that for best results this coating should be bright tin, chromium, aluminum of high light reflective and low light absorptive character, white enamel, or the like finish. Obviously where the base sheet 23 is tin plate, it already has a bright reflecting surface in the tin background. Over the background 25 there is disposed a coating 26 of a colorless adherent lacquer which serves as an adhesive. Such a lacquer may be methacrylate, nitrocellulose, oleo resinous or similar lacquers.

The lacquer is applied in liquid form and while it is still wet and sticky, it is covered with a layer of fine powdered particles 27 which embed themselves in the lacquer and are therefore held against displacement. These particles are preferably of a colorless transparent dry substance such as comminuted gum, gelatin, synthetic resins, etc.

In some instances the index of refraction of such particles will be widely different from that of the lacquer coating 26 and in other cases there will not be such a difference, depending upon the particular particles 27 and the particular lacquer 26 used. The different effects of these two conditions will be again referred to.

Over these particles there is then placed a binding spray coat 28 of a colorless water white lacquer or suitable finishing varnish such as for example methacrylate lacquer or the like. This final lacquer coating provides for the binding together of the small particles 27. Here again the binding lacquer index of refraction may widely differ from that of the small particles producing greater or less light dispersion as a result of the breaking up and refraction angle imparted to the light rays which strike the screen and which are in such a case refracted both by the particles themselves and by the coatings 26 and 28.

The under or adhesive coating 26 and also the final coating 28 may contain the same material as the particles 27. Both coatings in any event are a combination of solids in a solvent and the dissolved solids may be the same as the particles 27 or so similar as to their refraction index that there will be substantially no refraction as between the surfaces of the particles and the coating itself. Where this condition obtains the outline of the particles will undergo a change as the result of the dissolving effect of the solvent in the lacquer and the small particles which were originally sharp cornered and crystalline will be transformed into more or less rounded beads or points which when light is projected onto them more completely returns the light without utilizing the refractory effect of both particles 27 and coatings 26 or 28.

In either case the desired uniform reflection is obtained for the screen, when viewed from different angles. The important feature incident to a cheap but effective medium as above explained is in providing independent particles bound together in a way to produce reflecting and refracting surfaces which will disperse the light striking the surface with a substantially uniform spreading effect so that when viewing the image on the screen surface all portions will be evenly illuminated and this without any substantial loss of light. In one case the light leaving the surface of an angular particle is further broken up by refraction of the coating medium.

In the other example given the particle is modified to provide a reflecting and refracting surface which will give the required dispersion of light of itself without any further refraction of the surrounding coatings into which the particles are imbedded.

For practical purposes a protective coating 31 of paint or the like will be applied to the back of the screen. This will act as a protection of the metal against deterioration. Having such a screen medium built up on the base sheet 23 a very efficient yet economical screen is produced and by use of the attaching lugs 21 such a screen may be rigidly secured into flat position in a convenient frame structure which possesses great convenience for use for the purpose for which the screen is designed.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a projection screen having a frame structure provided with a peripheral molding surrounding a depressed panel and a screen member secured within said panel: the improvement characterized by constructing said screen member of a metal base plate held against flexure by a contacting wall of said panel, an integral bright light reflecting surface on said metal base plate, an adhesive coating of transparent colorless lacquer on said reflecting surface, a layer of finely comminuted colorless transparent particles partially embedded in said lacquer, said particles being intimately associated and partially dissolved by said lacquer to provide rounded surfaces capable of reflecting substantially all light rays received by said bright reflecting surface on said metal base plate, and an outer binding coating of colorless transparent water-white lacquer on said layer of finely comminuted transparent particles to preserve the latter in position, whereby said screen is capable of returning to the observer a uniformly dispersed diverging reflection of light rays having substantial equal intensity when viewed from any angle and direction.

2. In a projection screen having a sheet-metal frame structure provided with a depressed panel with slots in a margin thereof, and a screen element having lugs engaged in said slots and held against flexure by a wall of said panel: the improvement characterized by constructing said screen element of a sheet metal base plate, an integral bright light reflecting metallic surface coating on said plate, an adhesive coating of transparent colorless lacquer on said reflecting surface, a layer of finely comminuted colorless particles partially embedded in said lacquer, said particles being intimately associated and partially dissolved by said lacquer to provide rounded surfaces capable of reflecting substantially all light rays received by said bright reflecting surface on said metal base plate, and an outer binding coating of colorless transparent water-white varnish on said layer of particles to preserve the latter in position, said varnish having an index of refraction different from that of said finely communited particles, whereby said screen is capable of returning to the observer a uniformly dispersed diverging reflection of light rays having substantial equal intensity when viewed from any angle and direction.

FREDERICK C. BASELT.